United States Patent [19]
Penley

[11] Patent Number: 6,135,897
[45] Date of Patent: Oct. 24, 2000

[54] FLEXIBLE TIP FOR GOLF CLUB SHAFT

[75] Inventor: Carter L. Penley, San Diego, Calif.

[73] Assignee: Penley Sports, LLC, San Diego, Calif.

[21] Appl. No.: 09/187,671

[22] Filed: Nov. 6, 1998

[51] Int. Cl.[7] .................................................. A63B 53/10
[52] U.S. Cl. ................................. 473/319; 273/DIG. 23
[58] Field of Search ................................ 473/316–323

[56] References Cited

U.S. PATENT DOCUMENTS

| | | |
|---|---|---|
| 2,460,445 | 2/1949 | Bigler . |
| 2,652,256 | 9/1953 | Thomas . |
| 3,961,796 | 6/1976 | Thompson . |
| 4,169,595 | 10/1979 | Kaugars . |
| 4,423,874 | 1/1984 | Stuff, Jr. . |
| 4,555,112 | 11/1985 | Masaghati . |
| 4,563,007 | 1/1986 | Bayliss et al. . |
| 4,607,846 | 8/1986 | Perkins . |
| 4,736,951 | 4/1988 | Grant . |
| 5,093,162 | 3/1992 | Fenton ..................................... 473/319 |
| 5,192,073 | 3/1993 | Iwanaga et al. . |
| 5,294,119 | 3/1994 | Vincent .................................. 473/318 |
| 5,599,242 | 2/1997 | Solviche ................................. 473/318 |
| 5,626,529 | 5/1997 | Roy ........................................ 473/319 |
| 5,943,758 | 8/1999 | Haas ....................................... 473/318 |

*Primary Examiner*—Jeanette Chapman
*Assistant Examiner*—Stephen L. Blau
*Attorney, Agent, or Firm*—Nydegger & Associates

[57] ABSTRACT

A shaft for a golf club includes a main shaft, a ring shaft and a flex shaft which are mounted onto the distal end of the main shaft, and a sleeve which may be used to cover the ring shaft portion and the flex shaft portion. Each portion of the shaft is made of a material that is specifically selected for its particular modulus of elasticity, and the modulus of each portion is selected relative to the moduli of the other portions. For the present invention, the ring shaft portion has the highest modulus of elasticity, and the flex shaft portion has the lowest. With this combination, a club head is affixed to the extreme distal end of the main shaft, and a grip is attached to the proximal end of the main shaft portion. As intended for the present invention, the flex shaft portion of the shaft absorbs the impact and transfers the force that is generated when the club head hits a golf ball, the ring shaft portion dampens this force, and the main shaft portion transfers the impact force through the grip to the golfer in an informative and meaningful manner.

15 Claims, 1 Drawing Sheet

U.S. Patent  Oct. 24, 2000  6,135,897
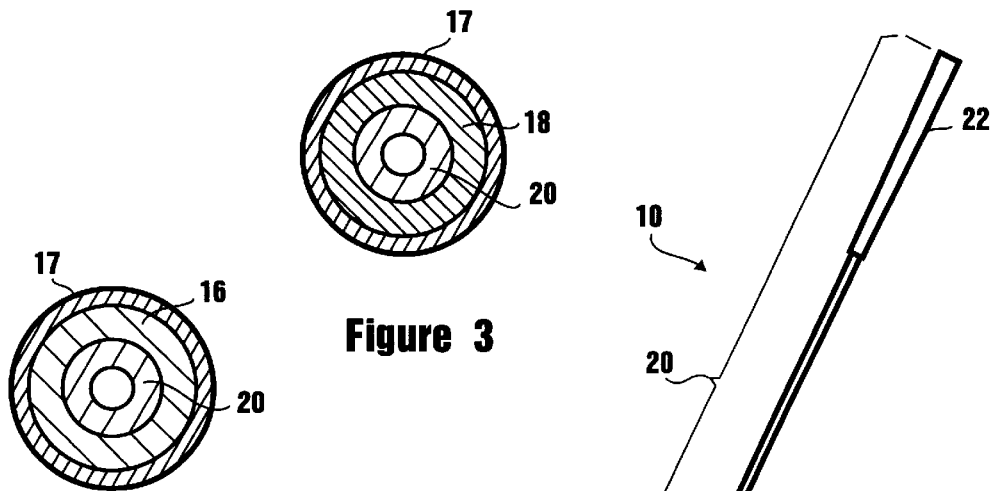
Figure 3
Figure 2
Figure 1
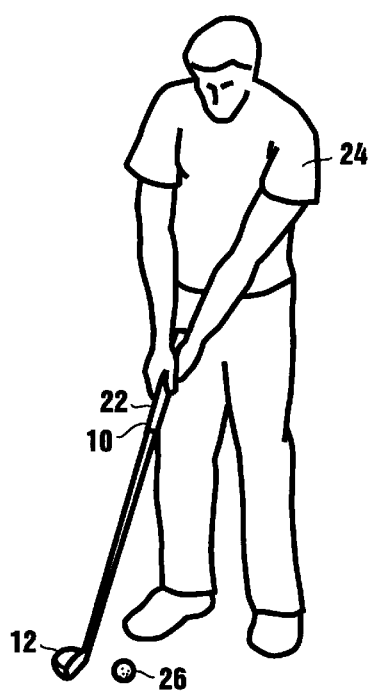
Figure 4
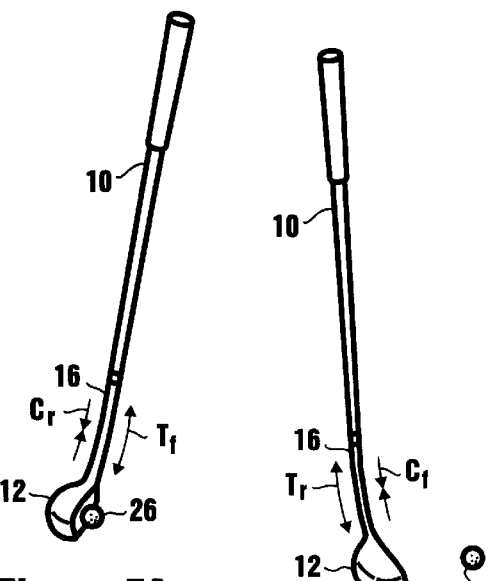
Figure 5A
Figure 5B

FLEXIBLE TIP FOR GOLF CLUB SHAFT

FIELD OF THE INVENTION

The present invention pertains generally to golf clubs and to methods for their manufacture. More specifically, the present invention pertains to the shafts of golf clubs which interconnect the club head with the grip. The present invention is particularly, but not exclusively, useful as a golf club shaft which effectively absorbs the impact force generated on the golf club as the club head hits a golf ball, to 1) effectively transfer indications ("feel") of this impact force to the golfer in an informative and meaningful manner, and 2) efficiently concentrate the impact force on the golf ball for improved performance.

BACKGROUND OF THE INVENTION

The dynamics that are involved when a golf club properly hits a golf ball are extremely complicated. Due to the particular configuration of a golf club, both bending and torsional forces are directly transferred from the club head to the club shaft whenever a golf ball is hit. The interaction of these transferred forces with the impact force on the ball is important for at least two reasons. On the one hand, for purposes of control, it is important that the proper indications of the impact force between the golf ball and the club head be transferred through the golf club shaft to the golfer. This gives the golfer the so-called "feel" of the swing. On the other hand, for purposes of power, it is important that the golf ball receive as much of the impact force as possible. For both purposes, it is also important that the club shaft be able to withstand the forces which are generated.

It is not an all together uncommon occurrence for a club head to break or snap off from the club shaft, or for the club shaft to otherwise become permanently deformed, when the club head contacts a golf ball, or some other object, during a golf swing. Based on empirical evidence, it happens most often that this unwanted event is the result of bending forces which are generated on the club shaft as the golf ball is being hit. To illustrate this point, refer for the moment to the drawings and, specifically, to FIGS. 4, 5A and 5B.

During the swing of a golf club, forces are generated on the club even before there is impact with the golf ball (see FIG. 4). From a structural standpoint, these forces are not overly significant. Upon impact with the golf ball, however, forces are generated on the golf club which are, structurally, very significant. As shown in FIG. 5A, during the impact of the club head with a golf ball, the impact force causes the golf shaft to bend. Specifically, the golf shaft bends in a manner which generates a tension force, $T_f$, on the forward edge of the shaft, and a compression force, $C_r$, on the rear edge of the shaft. Immediately after impact, the force distribution is reversed and the shaft bends in the opposite direction. As shown in FIG. 5B, once the golf ball has separated from the club head, the shaft bends in a manner which generates a compression force, $C_f$, on the forward edge of the shaft, and a tension force, $T_r$, on the rear edge of the shaft. It is known that the action of this force reversal will continue briefly and can either cause a permanent deformation of the shaft or cause the club head to actually snap off the club shaft. To avoid these unwanted results, and to provide a meaningful and useful response to the golfer, the manufacturer of a golf club shaft must address several issues. Specifically, the materials, the characteristics of the materials, and the configuration of the materials that are used for the manufacture of the golf shaft all become important considerations. More specifically, for the dynamic conditions confronted during the swing of a golf club, material elasticity is a primary concern.

Several aspects of material elasticity need to be considered when designing a golf club shaft. To begin, by definition, the elasticity of a material is the tendency of the material to return to its original size or shape, after it has been stretched, compressed, or deformed. While all materials have some elasticity, they also have limits. Specifically, the elastic limit of a material is the limiting value of the deforming force beyond which the material does not return to its original shape or dimensions when the force is removed. Not surprisingly, it happens that different materials have different elastic limits. Furthermore, the responsive behavior of different materials within their respective elastic ranges will also be different.

An indicator of the different responses of materials in their elastic ranges is known as the material's modulus of elasticity. Again, by definition, the modulus of elasticity of a material is the ratio of stress to strain that is experienced by a material in its elastic range. More specifically, the modulus of elasticity is the ratio of the stress that is caused in a material by the action of deforming forces to the strain or change in dimensions or shape of the material during deformation. Insofar as the manufacture of a golf club shaft is concerned, the modulus of elasticity is an important consideration for determining whether the particular material will be able to handle the forces which are generated during a golf swing. Additionally, when different materials are used in the manufacture of a golf club shaft, the location and configuration of these materials, as well as the interactive and cooperative effects of their respective moduli of elasticity will be important considerations.

In light of the above, it is an object of the present invention to provide a golf club shaft which has material characteristics that will withstand the repeated impact forces to which the shaft is routinely subjected during a game of golf. It is another object of the present invention to provide a golf club shaft which is able to transfer impact forces to the golfer in an informative and meaningful manner. Still another object of the present invention is to provide a golf club shaft which focuses and concentrates the impact forces between a club head and a golf ball onto the golf ball for improved performance. Yet another object of the present invention is to provide a method for manufacturing a golf club shaft which is relatively easy to perform and comparatively cost effective.

SUMMARY OF THE PREFERRED EMBODIMENTS

A golf club shaft in accordance with the present invention includes three distinct and different portions which are aligned and interconnected with each other. These include a main shaft, a ring shaft, and a flex shaft. The grip of the club is attached to the proximal end of the main shaft, and the hosel of the club head is affixed to the distal end of the main shaft. The ring shaft and the flex shaft are positioned over the main shaft with the flex shaft distal to the ring shaft and positioned between the ring shaft and the hosel.

In overview, the materials chosen for the manufacture of golf club shafts in accordance with the present invention will have specific characteristics which are indicated and exemplified by their respective moduli of elasticity. Insofar as the materials that are used, and the arrangement of the various portions along the length of the shaft are concerned, all clubs in a set of golf clubs will have the same general configuration. On the other hand, the dimensions of a particular golf club shaft will depend on the club that is being manufactured. For example, the club shaft of a number 5 iron will have different dimensions than the club shaft of a number 2 wood.

In detail, the main shaft of the golf club shaft is an elongated tubular member which has a proximal end and a distal end. For the purposes of the present invention, the main shaft is preferably made of graphite and has a modulus of elasticity that is generally in the range of approximately thirty to fifty five million pounds per square inch (30–55 MSI). Bonded to the main shaft at its distal end are the ring shaft and the flex shaft. For the present invention, the ring shaft is a relatively short annular shaped member which has a modulus of elasticity that is in a range of approximately fifty to sixty million pounds per square inch (50–60 MSI). Preferably, the ring shaft is made of boron. In comparison with the ring shaft, the flex shaft has a much lower modulus of elasticity which is in a range of approximately ten to twenty million pounds per square inch (10–20 MSI). For the present invention, the flex shaft portion is preferably made of a composite material such as Kevlar®. Further, a graphite sleeve can be placed over the flex shaft to cover its outer surface. Alternatively, the sleeve can also be placed over the ring shaft. As contemplated for the present invention, the ring shaft portion, and the flex shaft portion are attached to the main shaft portion by any of several methods well known in the pertinent art, such as and adhesive bonding, a wrapping, or an interlaminar wrap.

In the use of the golf club shaft of the present invention, the flexibility of the flex shaft portion gives the shaft at least two beneficial performance capabilities. First, due to the flexibility of the flex shaft portion, and its excellent tensile strength characteristics, the golf club shaft is able to accommodate stress reversals caused by an impact force and is, therefore, less likely to be deformed or broken upon impact with an object (a golf ball). Second, this same flexibility allows the club head to impart a maximum force on the golf ball during their mutual contact at impact. Meanwhile, the ring shaft, with its less flexibility, is able to dampen and dissipate the high vibration spikes and harmonic frequencies which are exhibited by the flex shaft following impact with the golf ball. In concert with the reactions of the flex shaft and ring shaft portions of the club shaft, the main shaft is then able to sustain the "feel" of the golf swing for the golfer. In this way, the golfer is able to experience an informative and meaningful response to the golf swing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a front elevation view of a golf club incorporating the golf club shaft of the present invention;

FIG. 2 is a cross sectional view of the golf club as seen along the line 2—2 in FIG. 1;

FIG. 3 is a cross sectional view of the golf club as seen along the line 3—3 in FIG. 1;

FIG. 4 is a perspective view of a golfer during a swing at the instant before contact by the golf club head is made with the golf ball;

FIG. 5A is at top view of the golf club at the moment the club head makes contact with the ball during a golf swing; and FIG. 5B is a top view of the golf club, at a moment immediately following that shown in FIG. 3A, showing the golf ball in flight after it has been hit by the club head.

DESCRIPTION OF THE PREFERRED EMBODIMENT

Referring initially to FIG. 1, a golf club incorporating the club shaft of the present invention is shown and generally designated 10. As shown, the golf club 10 includes a club head 12 which is formed with a hosel 14. As will be appreciated by the skilled golfer, the exact shape of the club head 12, and the arrangement of the hosel 14 on the club head 12, can be varied as desired. Most assuredly, these components of the golf club 10 will be varied from club to club in a set of golf clubs.

By cross referencing FIG. 1 with FIGS. 2 and 3 it will be seen that the golf club 10 includes a flex shaft 16 and a ring shaft 18 which are positioned over a main shaft 20 and located at the distal end of the main shaft 20. Further, it will be seen that the flex shaft 16 is preferably covered with a sleeve 17. Also, it is to be appreciated that the ring shaft 18 can also be covered with the sleeve 17, if desired. In either case, the extreme distal end of the main shaft 20 is connected with the club head 12.

As contemplated by the present invention, the flex shaft 16 is made of a material that has excellent tension characteristics and which is particularly flexible. Several composite materials can be used for the manufacture of flex shaft portion 16. Preferably, however, the flex shaft 16 of the golf club 10 is made of a material such as Kevlar® which is relatively easy to work with and which can also be smoothed to provide a quality finish for the end product. In any event, for purposes of the present invention, the material chosen for the manufacture of the flex shaft 16 should have a relatively low modulus of elasticity which is approximately in the range of 10–20 MSI. As indicated in FIG. 2, the flex shaft 16 can be covered with a graphite sleeve 17 which will cosmetically give a visual impression of integrity and continuity between the flex shaft 16 and the main shaft 20.

The ring shaft 18 of the golf club 10 is much shorter than the flex shaft 16 and is much less flexible than the flex shaft 16. For the purposes of the present invention the ring shaft 18 should be made of a material which has a modulus of elasticity that is in the range of approximately 50–60 MSI. Preferably, for the present invention the ring shaft 18 is made of boron. Like the flex shaft 16, the ring shaft 18 may also be covered by the sleeve 17. If done, as indicated in FIG. 3, the sleeve 17 completely covers the ring shaft portion 18 and is bonded to the outer surface of the ring shaft portion 18 in a manner well known in the art.

For the golf club 10 of the present invention, the main shaft 20 is a generally tubular shaped member which has a grip 22 that is attached or mounted onto the proximal end of the main shaft portion 20. As indicated above, the ring shaft 18 and the flex shaft 16 are connected to main shaft portion 20 near its distal end. For example, first the flex shaft portion 16 can be superficially attached to the main shaft portion 20 near the distal end of the main shaft portion 20. Next, the ring shaft portion 18 can be superficially attached to the main shaft portion 20 adjacent to the flex shaft portion 16 and proximal thereto. These connections, and the incorporation of the sleeve 17, can be accomplished in any manner well known in the art, such as by thermal or adhesive bonding, wrapping, or interlaminar wrapping. Further, the main shaft portion 20 and the sleeve 17 are both preferably made of a material such as graphite which will have a modulus of elasticity that is in the range of approximately 30–55 MSI.

As mentioned above, the exact dimensions of the flex shaft 16, the ring shaft 18, and the main shaft 20 will depend on the particular club that is being manufactured. In general, however, it will be appreciated that the length of the flex shaft 16 will be in a range of approximately four to eight inches, the length of the ring shaft 18 will be in a range of approximately three-quarters to two inches, and the length of the main shaft 20 will be in a range of approximately thirty four to forty one inches for iron shafts and in a range of approximately thirty nine to forty six inches for word shafts.

Use of the golf club 10 is shown in FIG. 4 where it can be seen that a golfer 24 will hold the golf club 10 by the grip 22. The object of the golfer's swing is, of course, to hit a golf ball 26 with the club head 12 of the golf club 10. As shown in FIGS. 5A and 5B, an impact between the club head 12 and a golf ball 26 will cause the flex shaft 16 to experience a vibrating force reversal. Specifically, upon initial contact with the golf ball 26, the impact force will cause the flex shaft portion 16 to bend backwards, as shown in FIG. 5A. This places tension forces, $T_f$, on the forward edge of the portion 16, and compression forces, $C_r$, on the rear edge of the portion 16. The impact force, along with the energy now stored in the bent flex portion 16, will then drive the golf ball 26 into flight. The release of the stored energy in the flex portion 16, however, causes the flex portion 16 to bend forward into a configuration shown in FIG. 5B. If improper materials are used for the manufacture of the flex portion 16, the release of this stored energy can cause a golf shaft to snap near the hosel. The flex shaft 16 of the present invention, however, significantly minimizes the possibility this will happen.

After the golf ball has been hit, the ring shaft 18 and the main shaft 20 respectively dampen and transfer the impact forces to the golfer 24. Importantly, as this happens, the severity of the impact force must be minimized while the "feel" of the impact is preserved. For the present invention, the respective portions 16, 18 and 20 of the golf club 10 act together, in combination, to balance these concerns.

While the particular flexible tip for golf club shaft as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A shaft for a golf club which comprises:
    a main shaft portion having a proximal end and a distal end, said main shaft portion having a first modulus of elasticity;
    a ring shaft portion bonded to said main shaft portion near said distal end thereof, said ring shaft portion having a second modulus of elasticity, and wherein said second modulus of elasticity is greater than said first modulus of elasticity; and
    a flex shaft portion bonded to said main shaft portion near said distal end thereof with said flex shaft portion distal to said ring shaft portion and adjacent thereto, said flex shaft portion having a third modulus of elasticity, and wherein said first modulus of elasticity is greater than said third modulus of elasticity.

2. A shaft as recited in claim 1 wherein said first modulus of elasticity is in a range of approximately 30–55 MSI, wherein said second modulus of elasticity is in a range of approximately 50–60 MSI, and wherein said third modulus of elasticity is in a range of approximately 10–20 MSI.

3. A golf club comprising a shaft as recited in claim 1 and further comprising:
    a grip attached to said proximal end of said main shaft portion for holding said golf club; and
    a club head attached to said flex shaft portion opposite said ring shaft portion for hitting a golf ball.

4. A shaft as recited in claim 1 further comprising a sleeve for covering said flex shaft portion.

5. A shaft as recited in claim 4 wherein said main shaft portion and said sleeve are made of graphite, said ring shaft portion is made of boron, and said flex shaft portion is made of a composite material.

6. A shaft as recited in claim 1 wherein said sleeve covers said flex shaft portion and said ring shaft portion.

7. A shaft for use in hitting a golf ball, said shaft interconnecting a grip with a club head, said shaft comprising:
    a flex shaft portion having a third modulus of elasticity for absorbing and transferring an impact force when said club head hits said golf ball;
    a ring shaft portion having a second modulus of elasticity for damping said impact force; and
    a main shaft portion having a first modulus of elasticity connected to said flex shaft portion and said ring shaft portion for transferring said damped impact force to said grip, and wherein said second modulus of elasticity is greater than said first modulus of elasticity, and said first modulus of elasticity is greater than said third modulus of elasticity.

8. A shaft as recited in claim 7 wherein said first modulus of elasticity is in a range of approximately 30–50 MSI, wherein said second modulus of elasticity is in a range of approximately 50–60 MSI, and wherein said third modulus of elasticity is in a range of approximately 10–20 MSI.

9. A shaft as recited in claim 7 wherein said main shaft portion is made of graphite, said ring shaft portion is made of boron, and said flex shaft portion is made of a composite material.

10. A golf club comprising a shaft as recited in claim 7 and further comprising a grip attached to said proximal end of said main shaft portion for holding said golf club and wherein said club head is attached to said flex shaft portion opposite said ring shaft portion for hitting a golf ball.

11. A method for manufacturing a shaft for a golf club wherein the golf club includes a club head formed with a hosel, a grip, and the shaft, the method which comprises the steps of:
    providing a hollow tubular shaped main shaft portion having a first modulus of elasticity, said main shaft having a proximal end and a distal end;
    attaching a flex shaft portion having a third modulus of elasticity to said main shaft portion near said distal end of said main shaft; and
    attaching a ring shaft portion having a second modulus of elasticity to said main shaft adjacent said flex shaft portion and proximal thereto and wherein said second modulus of elasticity is greater than said first modulus of elasticity, and said first modulus of elasticity is greater than said third modulus of elasticity.

12. A method as recited in claim 11 wherein said step of attaching said flex shaft portion to said main shaft portion, and said step of attaching said ring shaft portion to said main shaft portion are accomplished by bonding.

13. A method as recited in claim 11 wherein said step of attaching said flex shaft portion to said main shaft portion, and said step of attaching said ring shaft portion to said main shaft portion are accomplished by wrapping.

14. A method as recited in claim 11 wherein said first modulus of elasticity is in a range of approximately 30–50 MSI, wherein said second modulus of elasticity is in a range of approximately 50–60 MSI, and wherein said third modulus of elasticity is in a range of approximately 10–20 MSI.

15. A method as recited in claim 11 wherein said main shaft portion is made of graphite, said ring shaft portion is made of boron, and said flex shaft portion is made of a composite material.

* * * * *